United States Patent
Periyalwar et al.

(10) Patent No.: US 7,664,082 B1
(45) Date of Patent: Feb. 16, 2010

(54) METHOD OF SCHEDULING WITH MULTIPLE RADIOS PER NODE IN A WIRELESS MULTIHOP NETWORK

(75) Inventors: Shalini Periyalwar, Nepean (CA); Kelvin Kar-Kin Au, Ottawa (CA); Nimal Senarath, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 825 days.

(21) Appl. No.: 11/239,336

(22) Filed: Sep. 30, 2005

(51) Int. Cl.
*H04W 4/00* (2009.01)
*H04L 12/28* (2006.01)
*H04L 12/56* (2006.01)

(52) U.S. Cl. .................................. 370/338; 370/395.4

(58) Field of Classification Search ................. 370/338, 370/395.4
See application file for complete search history.

(56) References Cited

U.S. PATENT DOCUMENTS

| | | | | |
|---|---|---|---|---|
| 6,414,955 | B1 * | 7/2002 | Clare et al. | 370/390 |
| 6,611,231 | B2 * | 8/2003 | Crilly et al. | 342/378 |
| 6,975,613 | B1 * | 12/2005 | Johansson | 370/338 |
| 2003/0088682 | A1 * | 5/2003 | Hlasny | 709/229 |
| 2006/0104301 | A1 * | 5/2006 | Beyer et al. | 370/445 |
| 2006/0268791 | A1 * | 11/2006 | Cheng et al. | 370/338 |

* cited by examiner

*Primary Examiner*—Vincent P Harper
*Assistant Examiner*—Marivelisse Santiago-Cordero

(57) ABSTRACT

A method of scheduling transmission from radios having multiple radios is provided, where the number of radios is smaller than then number of neighbours to which transmission needs to occur. Scheduling blocks are identified consisting of sets of neighbours that can be transmitted to simultaneously without interference. Then, the scheduling blocks are used for scheduling purposes.

20 Claims, 7 Drawing Sheets

METHOD OF SCHEDULING WITH MULTIPLE RADIOS PER NODE IN A WIRELESS MULTIHOP NETWORK

FIELD OF THE INVENTION

The invention relates to wireless multihop networks featuring multiple radios per node.

BACKGROUND OF THE INVENTION

In a wireless multihop network, each node corresponds with one or more neighbours. Most multihop solutions implemented to date have assumed that each node has a single radio that operates in a TDM (time division multiplex) fashion to communicate with each of its neighbours. In other words, the single radio is used to communicate in sequence with each of its neighbours. The use of a single radio in a node that has multiple neighbours contributes to delay and reduced throughput due to the sharing of the radio resource amongst all of the neighbouring nodes. A partial solution to this problem is to use multiple radios in each node such that the radios can simultaneously communicate with multiple neighbours. Depending on the number of neighbours a given node has versus the number of radios the node has, the radios may still need to be shared amongst the neighbours. More specifically, if there are more neighbours than there are radios, then radio sharing will need to be implemented. Also, even if there are as many radios as there are neighbours, interference may preclude the simultaneous operation of these radios to the neighbours.

A simple solution is to add radios to a node and then pre-assign the radios for each neighbour node. This is a static solution based on the number of existing neighbours. Each radio is equipped with its own scheduler.

SUMMARY OF THE INVENTION

According to a broad aspect, there is provided a method in a wireless network node comprising: for a set of neighbouring nodes to the wireless network node, determining a map of interfering neighbours that determines which neighbouring node(s) interfere with which other neighbouring node(s) were they to simultaneously communicate with the wireless network node; using the map of interfering neighbours, determining a set of scheduling blocks, each scheduling block comprising one or more neighbours that can be communicated with simultaneously without interference; scheduling communication with the neighbouring nodes using the scheduling blocks.

In some embodiments, scheduling communication to the neighbouring nodes comprises prioritizing the scheduling blocks.

In some embodiments, aggregate capacity is a factor considered in prioritizing the scheduling blocks.

In some embodiments, prioritizing the scheduling blocks comprises: determining a priority factor for each neighbouring node in a scheduling block; determining a composite priority for each scheduling block; scheduling the scheduling blocks using the composite priorities.

In some embodiments, the steps of determining a map of interfering neighbours and determining the set of scheduling blocks are performed whenever there is a change in wireless network topology.

In some embodiments, the steps of determining a map of interfering neighbours and determining the set of scheduling blocks are performed whenever a change in the propagation environment is detected.

In some embodiments, determining a set of scheduling blocks comprises, until all or sufficient scheduling blocks have been identified: selecting a first neighbour as a first member of a scheduling block; and iteratively selecting further neighbour(s) to be added to the scheduling block that do not interfere with those already selected.

In some embodiments, the method further comprises: mapping scheduling blocks to radios in a manner that minimizes the number of switches between radios used to communicate with a neighbour included in consecutively scheduled scheduling blocks.

In some embodiments, the method further comprises automatically detecting changes in network topology.

In some embodiments, the method further comprises: self-determining how many radios are installed in the wireless network node; if there is a single radio, performing single radio scheduling; if there are multiple radios, performing the steps of determining the map of interfering neighbours, determining the set of scheduling blocks, and scheduling transmission to the neighbouring nodes using the scheduling blocks.

In some embodiments, the method further comprises: performing neighbour discovery to identify the set of neighbour nodes; if the number of neighbours is less than or equal to the number of radios, and non-interfering communication with all of the neighbours is possible, dedicating a radio per neighbour; if the number of neighbours is greater than the number of radios, or non-interfering communication with all of the neighbours is not possible, performing the steps of determining the map of interfering neighbours, determining the set of scheduling blocks, and scheduling communication with the neighbouring nodes using the scheduling blocks.

In some embodiments, scheduling communication with the neighbouring nodes using the scheduling blocks comprises: negotiating with members of a scheduling block to determine time and duration to schedule the scheduling block; communicating with members of the scheduling block for the agreed upon time and duration.

In some embodiments, the method further comprises: performing said negotiation immediately before or immediately after completing a data communication with members of the scheduling block for a current scheduling period.

In some embodiments, the method is implemented simultaneously by a plurality of wireless nodes in the wireless network.

According to another broad aspect, there is provided a wireless network node comprising: at least two radios; an interference mapper adapted to determining a map of interfering neighbours that determines which neighbouring node(s) interfere with which other neighbouring node(s) were they to simultaneously communicate with the wireless network node; a scheduler adapted to use the map of interfering neighbours to determine a set of scheduling blocks, each scheduling block comprising one or more neighbours that can be communicated with simultaneously without interference, and to schedule communication to the neighbouring nodes using the scheduling blocks.

In some embodiments, the scheduler prioritizes the scheduling blocks.

In some embodiments, the steps of determining a map of interfering neighbours and determining the set of scheduling blocks are performed whenever there is a change in wireless network topology, and/or whenever a change in the propagation environment is detected.

In some embodiments, the wireless network node is further adapted to self-determine how many radios are installed in the wireless network node and to perform single or multi-radio scheduling based on how many radios are installed in the wireless network node.

In some embodiments, the scheduler schedules communication with the neighbouring nodes using the scheduling blocks by negotiating with members of a scheduling block to determine time and duration to schedule the scheduling block.

According to another broad aspect, there is provided a wireless network comprising a plurality of the wireless network nodes.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
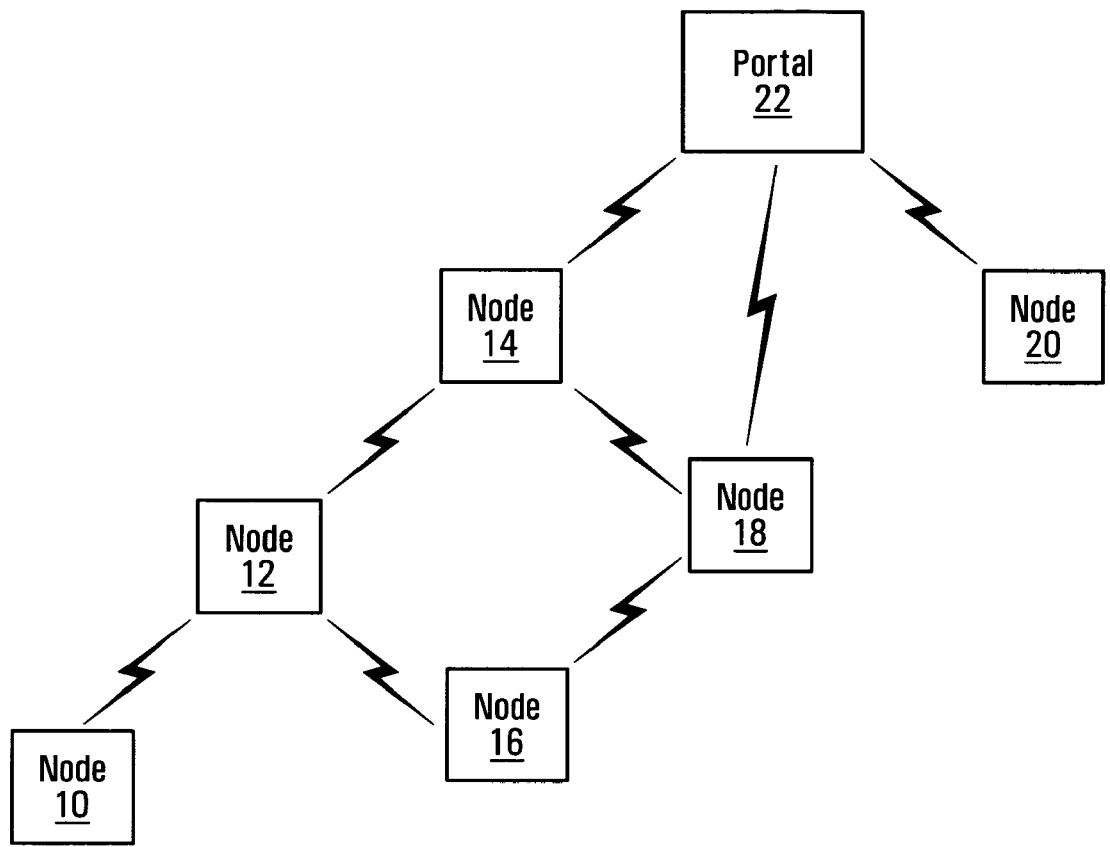
FIG. 1 is a block diagram of an example wireless multihop network.

A very simple example of a wireless multihop network is shown in FIG. 1. Shown is a collection of wireless nodes 10, 12, 14, 16, 18, 20 with wireless connections drawn between neighbouring nodes. Node 12 is shown with three neighbours 10, 14, 16; and node 16 has two neighbours 12, 18. Traffic from a source can be routed to a destination by one or more intermediate nodes. A portal 22 may exist in the wireless multihop network that serves as an anchor point for traffic flowing to and from the network. The nodes may or may not provide wireless access capability. At least some of the nodes are equipped with multiple radios such that they can communicate with multiple radios simultaneously.

Figure 2:
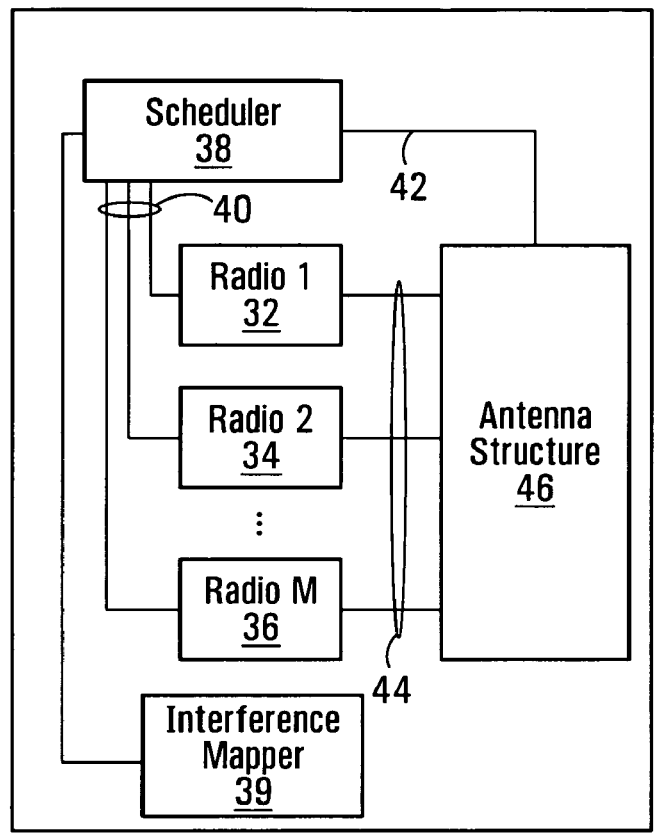
FIG. 2 is a block diagram of an example node having multiple radios that can perform scheduling in accordance with an embodiment of the invention.

Embodiments of the invention provide a self-organizing method of assigning the multiple radios in a node to communicate simultaneously with a number of neighbouring nodes in a wireless multihop network. A block diagram of a node for use in such a network is shown in FIG. 2. Shown is a set of M radios 32, 34, 36. In the general implementation, there needs to be at least two radios, but any number of radios can be implemented. Also shown is an antenna structure 46. Antenna structure 46 transmits simultaneously a signal from each of the M radios 32, 34, 36. Also shown is a scheduler 38 that generates control and/or data outputs 40 for the radios 32, 34, 36, and generates a control output 42 for the antenna structure 46. The connections between the radios 32, 34, 36 and the antenna structure 46 are indicated at 44. Finally, also shown is an interference mapper 39 that generates an interference map for use by the scheduler 38.

Antenna structure 46 is any antenna structure that allows directional communication with the neighbours. In an example implementation, the antenna structure 46 consists of a set of K statically formed beams that are arranged to provide approximately 360° coverage such that a respective neighbour can be communicated with on each of the statically formed beams. The actual number of neighbours for a given node will be referred to as "N" and N will be at least one and as great as K for a given node. At any instant, each of the radios 32, 34, 36 is communicating over one of the antenna beams.

Figure 3:
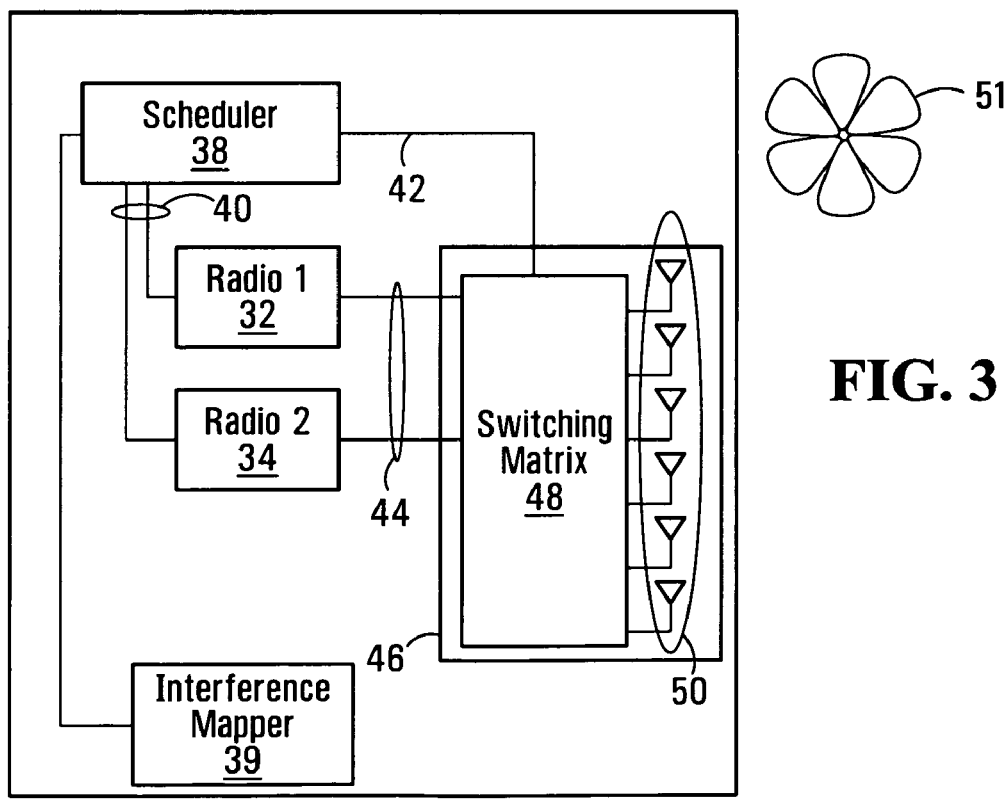
FIG. 3 is a block diagram of an example node having multiple radios that can perform scheduling in accordance with an embodiment of the invention.

A particular example of this is shown in FIG. 3 where an antenna structure featuring six antennas 50 is shown. A switching matrix 48 interconnects the radios, in this case two radios 32, 34, over interconnections 44 to the set of six antennas 50. An example coverage pattern for the antennas is indicated at 51 with the six antennas providing approximately 360° coverage. They may or may not be overlapped between adjacent beams.

In another example, the antenna structure 46 can be a beam steering array that allows up to M beams to be formed and dynamically steered. Other implementations for the antenna structure 46 are possible.

The scheduler 38 is responsible for determining which radios will be used to communicate with which neighbours at any given time. This scheduler 38 does this in conjunction with an interference map produced by the interference mapper 39. The interference mapper 39 dynamically determines for each neighbour which other neighbours can be considered interfering neighbours. The interference mapper 39 operates dynamically in the sense that if a new neighbour is added to the network, the interference mapper 39 will update the interference map for use by the scheduler. The frequency or schedule of updates is an implementation specific detail. It may, for example, be determined by the network operator. An example of an interference mapper 39 is described below. The scheduler 38 takes into account the interference map by not scheduling transmissions to two neighbours simultaneously that are identified as interfering.

The scheduler 38 and interference mapper 39 can be implemented in any one or suitable combination of hardware, software, firmware, etc. They can be implemented as separate components or as part of one component. Furthermore, it is to be understood that a very specific layout of a node in a wireless multihop network is shown in FIG. 2. More generally, the embodiments described herein are applicable to any node that has at least two radios and that needs to be able to transmit to more than two neighbours.

Figure 4:
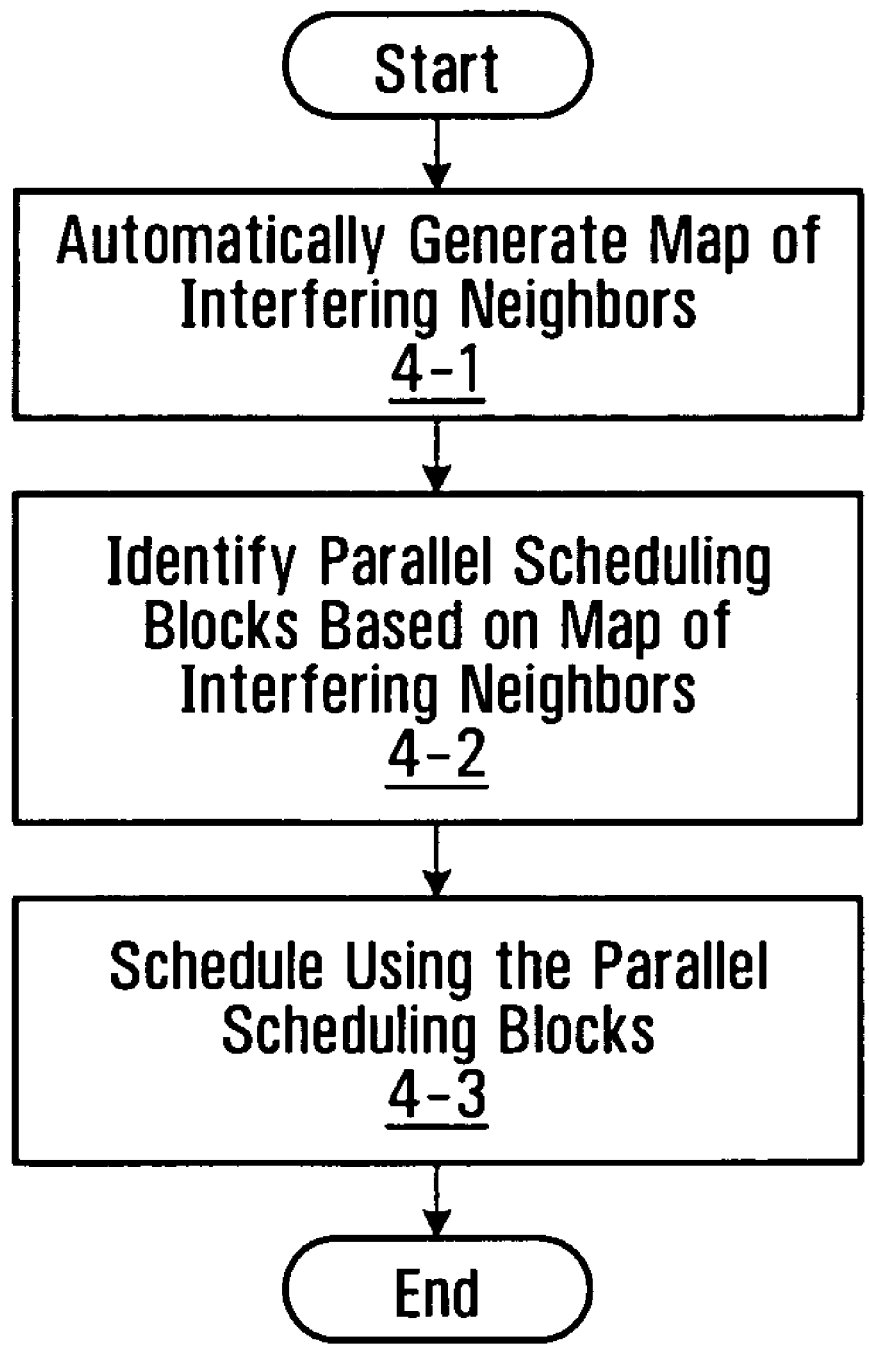
FIG. 4 is a flowchart of an example method of scheduling multiple radios in accordance with an embodiment of the invention.

Referring now to FIG. 4, shown is a flowchart of an example method of scheduling in a multihop wireless network. The method might for example be applied using the nodes described with reference to FIGS. 2 and 3, but also has wider application. The method begins with the automatic generation of a map of interfering neighbours (step 4-1). The map of interfering neighbours can come in any suitable form allowing a determination for a given node, of which neighbours cannot be transmitted to simultaneously due to interference. Next, parallel scheduling blocks are identified based on the map of interfering neighbours (step 4-2). More specifically, having determined which neighbours interfere with each other, a scheduling block consists of a set of neighbours that can be transmitted to simultaneously without any interference problems as defined for a particular implementation.

Finally, scheduling is performed at step 4-3 using the parallel scheduling blocks. Various prioritization/scheduling schemes are described below.

Any appropriate mechanism can be used to determine the map of interfering neighbours that allows a quantitative or qualitative assessment of the impact of data in one link to the other link. For example, a beacon signal can be transmitted to a neighbour, and the signal strength being received by all neighbours measured to assess interference. Alternately, the interference map may be determined on the analysis of live data.

Figure 5:
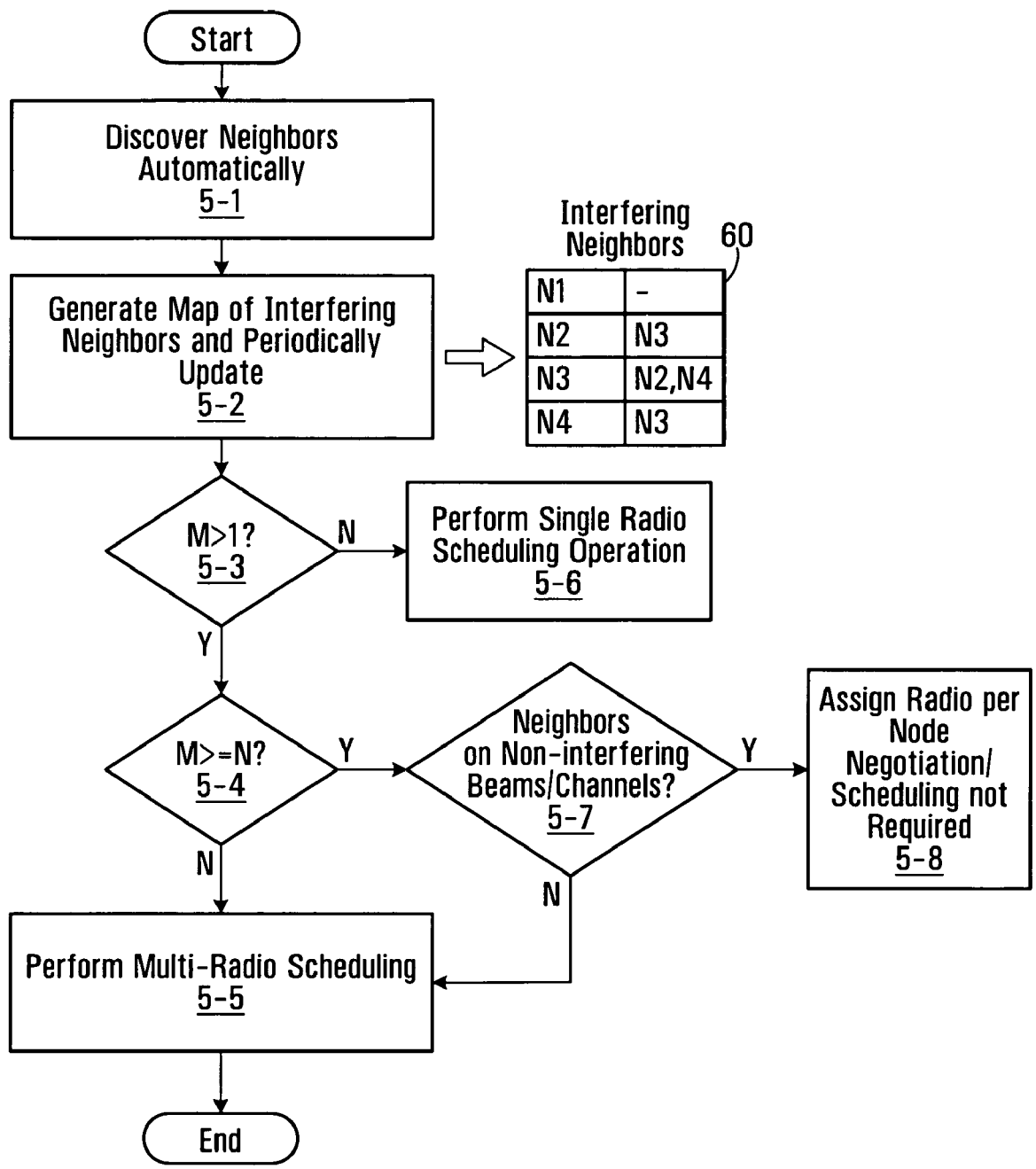
FIG. 5 is a flowchart of an example method of determining whether or not multi-radio scheduling is required at a given node.

In some implementations, the multi-radio scheduling capability is installed in a radio, but the capability is not used unless it is appropriate. This reflects the fact that the number of neighbours a node has can change over time. Referring now to FIG. 5, shown is a flowchart of an example method that can be used to determine whether or not multi-radio scheduling needs to be employed by a given node at a given time. This method might be run after a change in the network, for example. Alternatively it could be run at some frequency or schedule set by a network operator. The method starts at step 5-1 with the automatic discovery of neighbours. At step 5-2, the map of interfering neighbours is generated, for example using the interference mapper 39 of FIG. 2. It is noted that the same interference map can be used in step 5-2 as is used in the updating of scheduling blocks described previously. An example of such a map is given at 60 for a node having four neighbours N1, N2, N3, N4. With this particular map of interfering neighbours, node N1 has no interfering neighbours meaning that it can be scheduled simultaneously with any of the other nodes. Node N2 interferes with node N3; node N3 interferes with nodes N2 and N4, and finally node N4 interferes with node N3. Next, at step 5-3 a determination is made of whether or not the number of radios is greater than one. This step is preferably implemented in nodes that are built in such a manner as to allow a varying number of radios to be implemented in each node, potentially with the number of radios to be changed for upgrading purposes after deployment. If the number of radios in all of the nodes in a given system is to be fixed, then step 5-3 could be skipped. In the event there is only a single radio, then single radio scheduling is performed at step 5-6.

At step 5-4, a determination is made as to whether or not the number of radios M is greater than or equal to the number of neighbours N. If the number of radios is greater than or equal to the number of neighbours (yes path, step 5-4), and all of the neighbours are on non-interfering beams/channels (yes path, step 5-7), then a radio per node can be assigned at step 5-8, and no negotiation/scheduling is required. In other words, since there are enough radios for each neighbour to have its own dedicated radio, and the channels to the different neighbours are non-interfering, the radios can be permanently assigned to neighbours. On the other hand, if the neighbours are on interfering beams/channels (no path step 5-7), or if there are fewer radios than neighbours (no path step 5-4), then multi-radio scheduling needs to be performed as indicated at step 5-5.

Figure 6:
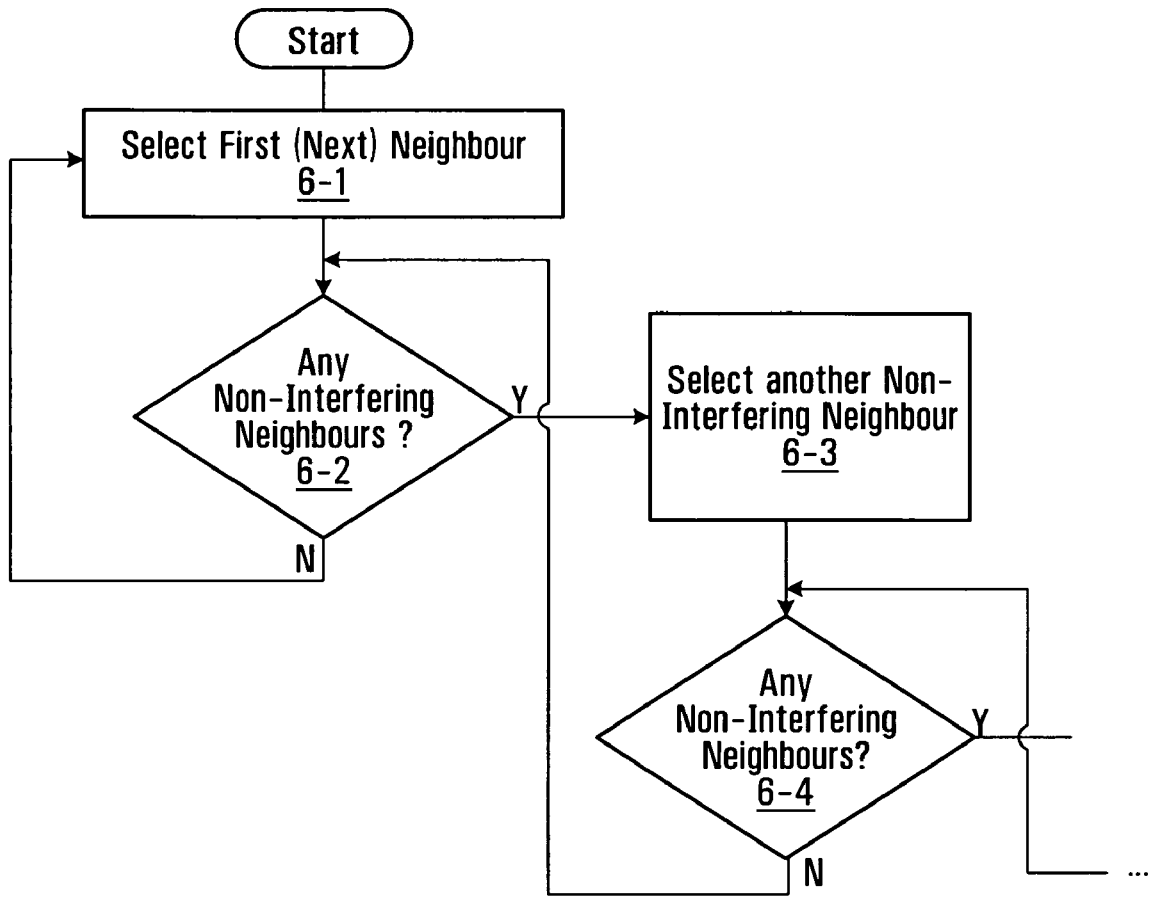
FIG. 6 is a flowchart of an example method of determining scheduling blocks.

Referring now to FIG. 6, shown is a flowchart of an example method of determining parallel scheduling blocks. This method is designed to select the largest possible scheduling blocks, i.e. the scheduling blocks with the most members.

The method begins at step 6-1 with selecting one of the neighbours, randomly or according to some order. This neighbour is then added to the scheduling block. At step 6-2, using the map of interfering neighbours, a determination is made as to whether or not there are any additional non-interfering neighbours, namely neighbours that do not interfere with the already selected neighbour. If there are no additional neighbours (no path step 6-2), then that is the end of the generation of that scheduling block, and the scheduling block consists of the single neighbour. The method then continues at 6-1 with the selection of another neighbour. On the other hand, if there are non-interfering neighbours (yes path 6-2), then one of these is selected randomly or according to some order and added to the scheduling block at step 6-3. If there is only one non-interfering neighbour then that neighbour is selected. At step 6-4, a determination is made of whether there are any further non-interfering neighbours. If not, (no path, step 6-4) then the method ends and the scheduling block is complete and has two members. On the other hand, if there are further non-interfering neighbours (yes path step 6-4), then the method continues with selecting another non-interfering neighbour (not shown), and so on until as many non-interfering neighbours are selected as possible so as to generate the largest possible scheduling block. Of course the maximum size of a scheduling block is limited by the number of radios.

The scheduling blocks are then available for use by the scheduler. It is noted that while a given scheduling block may have up to K members, any subset of those members is also a valid scheduling block. However, for throughput optimization reasons it would be preferred to always use the maximum capacity of a given scheduling block. It may be the case that a given member of a maximum capacity scheduling block has nothing to transmit, or scheduling issues make one of the neighbours unavailable in which case a reduced-size scheduling block can be used.

It can be seen that the scheduling block determination method is a function of the map of interfering neighbours. Upon any change taking place to the map of interfering neighbours the list of scheduling blocks would need to be updated. A particular flowchart/method has been illustrated to show an example of how the scheduling blocks are determined by selecting a first neighbour as a first member, and then iteratively adding further neighbours to the scheduling block that do not interfere with those already selected. It is to be understood that more generally what is being done is making a determination of which sets of neighbours can be transmitted to simultaneously based on the map of interfering neighbours. A particular method has been shown but of course many different implementations that achieve this functionality could be alternatively employed. In some embodiments, each node determines when there has been a change in wireless network topology, for example by periodically scanning for new neighbours. The map of interfering neighbours and scheduling blocks are updated whenever a change is detected. The map may also be updated when there is a change detected the propagation environment. For example, new buildings/trees etc. can have an effect upon how neighbouring nodes can communicate.

The method of FIG. 6 selects the neighbours that can be transmitted to simultaneously in a scheduling block. Any radio can be used to transmit to any of the selected neighbours during a given scheduling period. However, preferably the same radio is used to transmit to the same neighbour, if applicable, in the next scheduling period such that the antenna switching period is minimized.

For the purpose of example, it will now be shown how scheduling blocks can be generated for the interference map 60 of FIG. 5. Assuming that node N3 is selected first, the only non-interfering neighbour according to the map of interfering neighbours is node N1 and as such a first scheduling block consists of N3 and N1. Assuming node N2 is selected next, N2 has non-interfering neighbours N1 and N4. Assuming of N1 and N4 that N1 is selected first, then N1 is added to the scheduling blocks and therefore N2, N1 are in the block. Then, a check is made to see if there are any further non-interfering neighbours for N1 and N2, and it can be seen N4 is a further non-interfering neighbour. As such, another complete scheduling block is N2, N1, N4. As it turns out any remaining scheduling block is a permutation or subset of these two. As indicated above, preferably the same radio is used to transmit to the same node. Thus, the two scheduling blocks {N3, N1}, and {N2, N1, N4} are preferably mapped to radio 1, radio 2, radio 3 such that the same radio is used for transmissions to N1. Thus, an example set of parallel scheduling blocks is as follows:

| Radio 1 | Radio 2 | Radio 3 |
|---------|---------|---------|
| N3      | N1      |         |
| N2      | N1      | N4      |

It should be noted that, apart from the scheduling blocks that allow parallel transmissions, there are four default scheduling blocks whereby N1, N2, N3 or N4 occupies one of the three radios and others which are subsets of the scheduling blocks.

Round Robin Scheduling

In one scheduling approach that does not require ongoing prioritization, the radios operate over the scheduling blocks in a round-robin manner, with fixed time assignment to the scheduling blocks. An initial negotiation is required between the neighbours and the schedule will be changed periodically based on any changes in the network (e.g., addition/deletion of nodes).

Variable Rendezvous Scheduling

Figure 7:
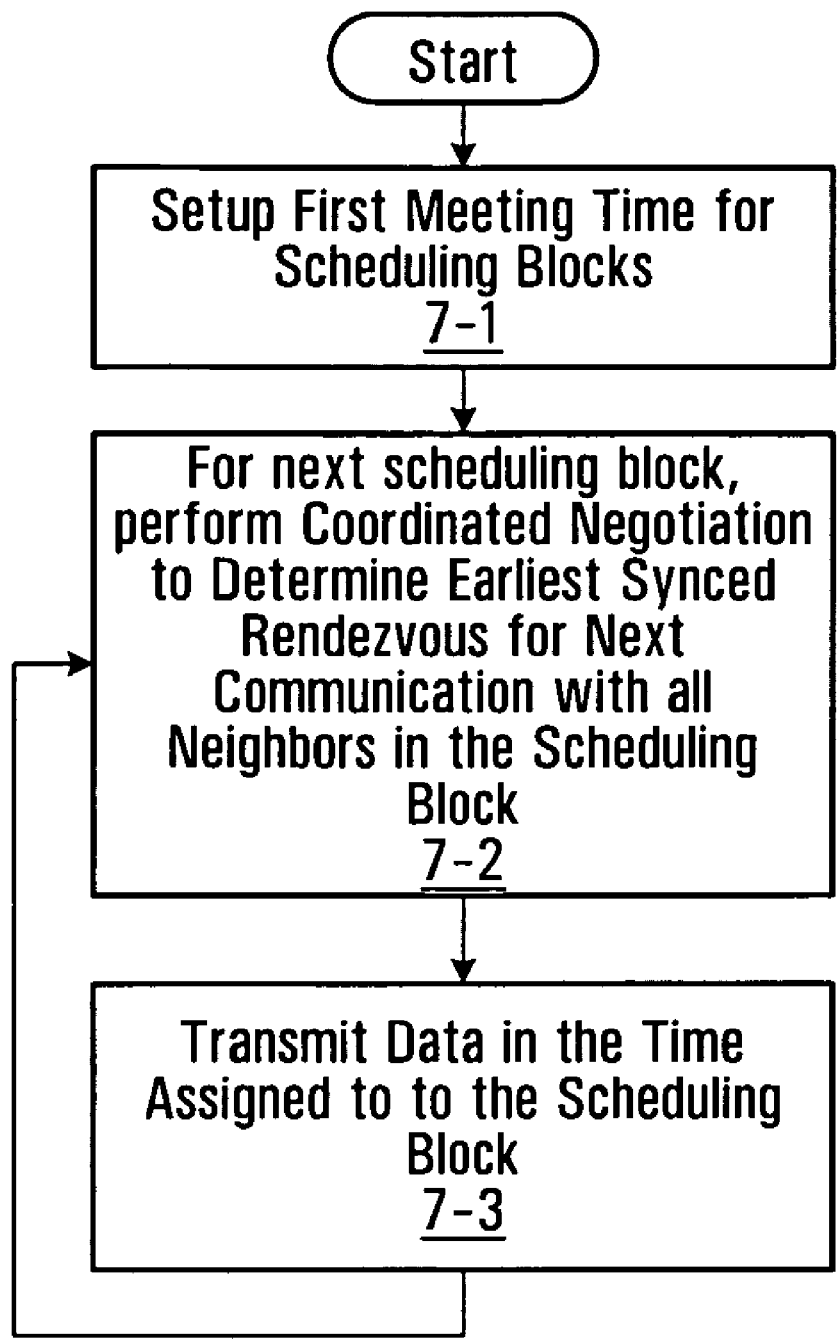
FIG. 7 is a flowchart of an example method of scheduling using the determined scheduling blocks.

Referring now to FIG. 7, shown is a flowchart of an example method of variable rendezvous scheduling.

Initially, or when there is a change to the set of scheduling blocks to be scheduled, all of the nodes communicate to set up a first transmission time for each scheduling block without regard to priority at step 7-1.

Figure 8:
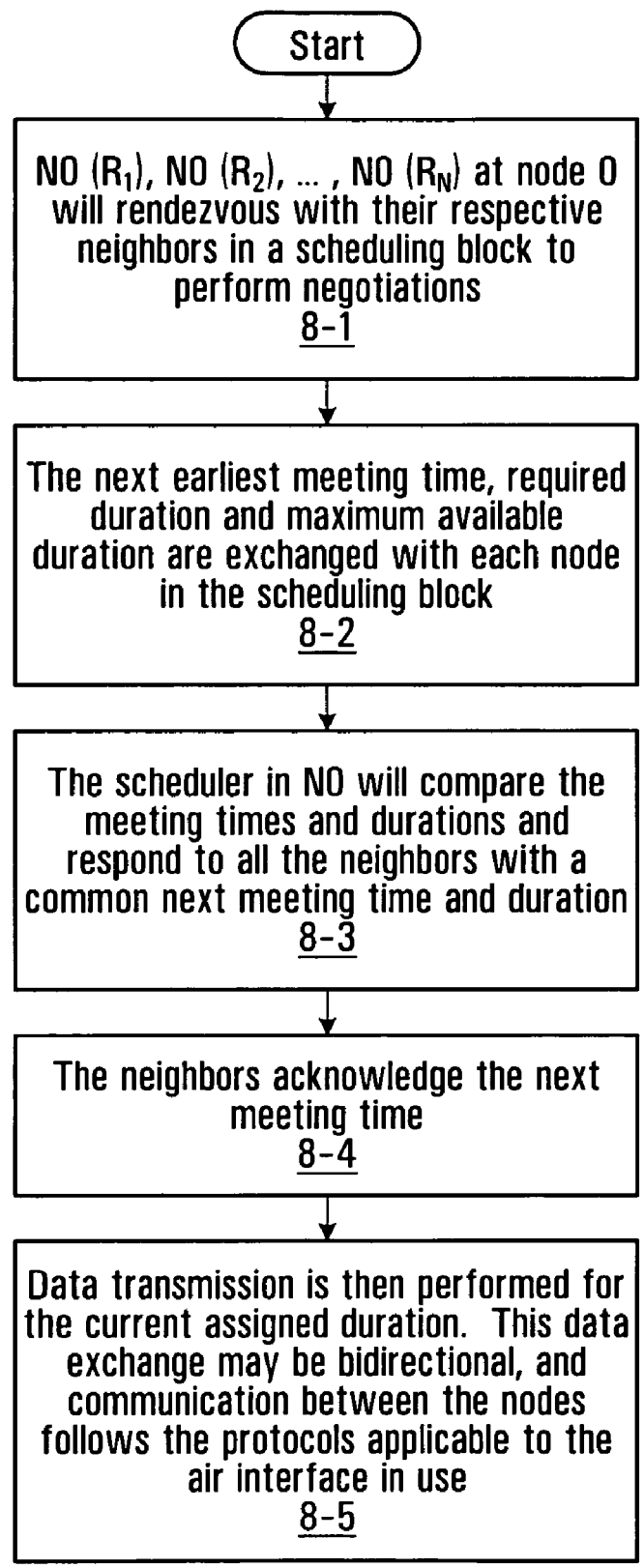
FIG. 8 is a flowchart of an example method of negotiating a next rendezvous time.

Each iteration of the method then begins with the negotiation between members of a scheduling block. The radios first negotiate with all of the neighbours in the scheduling block. A co-ordinated negotiation between some or all of the neighbour radios in the scheduling block is performed at step 7-2 to determine the next rendezvous availability during which all of the neighbours can simultaneously communicate. FIG. 8 described below provides an example of how negotiation might take place. The next rendezvous time and duration for this scheduling block can be collectively determined by the earliest meeting time that some or all neighbours in a given scheduling block can meet, and the maximum longest duration required amongst the neighbours in the scheduling block. Once this time is determined, this is communicated to all of the neighbours at the end of the negotiation period. It is noted that the amount of data to transmit to each of the neighbours may vary and that during negotiations, it is the maximum amount of data that needs to be transmitted by any of the neighbours in the scheduling block that is considered.

Once the rendezvous is set up, the process of data transmission occurs at the agreed upon time at step 7-3 and the set up of the next rendezvous time continues so as to provide a series of chained rendezvous. A node may continue to transmit in the entire duration of the allocated scheduling period (if packets arrive after a first transmission and the scheduling period is still active, the node may transmit again). Radios will not turn to their new assignment in the next scheduling block until the current scheduling duration has expired.

A variant of the above co-ordinated rendezvous approach can include some flexibility in the rendezvous periods of the nodes comprising a scheduling block. Such a need may arise when common scheduling blocks of multiple neighbours having conflicting needs with their neighbours are required to have synchronized meeting times. In a particular implementation the need to meet at the same time may be relaxed, provided the rendezvous and data transmission for all the nodes in a scheduling block happens within the maximum allocated time to the scheduling block. In another embodiment of the invention, all of the nodes common to a group of scheduling blocks may not need to be required to have synchronized transmission times. This can be realized by limiting the maximum number of neighbours that can be included in the group of scheduling blocks.

It was mentioned earlier that any subset of the scheduling blocks (comprising as few as one node of the scheduling block) can also be used for transmission, in the event it becomes cumbersome to co-ordinate all the nodes within the scheduling block. In such a scheme, a subset of scheduling blocks may be allowed to set up their own meeting times and transmission durations. While this approach may be suboptimal from the resource usage point of view, it provides a means to avoid unnecessary delays in case one of the nodes has a conflict. In another approach, the meeting times of two neighbours common to a given scheduling block may not be fully synchronized. A node may negotiate with each neighbour separately, but take into account the scheduling time allocated for the other neighbour which belongs to the same scheduling block so as to maximize resource usage. In such a scheme, techniques such as negotiating only with one neighbour at a time, and delaying the meeting time to have synchronous transmission whenever possible may be applied.

The method of FIG. 7 as described does not take into account prioritization; rather, each scheduling block re-schedules itself based on availability of neighbours. In another embodiment, an ongoing prioritization of the scheduling blocks is performed. For example, a prioritization list of scheduling blocks is maintained on an ongoing basis such that each scheduling block has a respective priority.

In one application of such priorities, the priorities are used to determine the length of time nodes will be allowed to communicate, up to a maximum time per rendezvous. This can be applied in the context of a round-robin rendezvous in which rendezvous takes place in a round robin sequence, but with variable in time, with the meeting times varying based on allocated data transmission time.

In another application of such priorities, the priorities are used to perform "packing". This will be described by way of example. Nominally, scheduling is done using the variable rendezvous time describe above. However, if that ends up being inconsistent with priorities, packing is performed to make adjustments. For example, assume there are two scheduling blocks (A, B) and (C, D). At time t0 (A, B) has higher priority. Therefore, scheduling starts with (A, B) and the next rendezvous time is established at time t1>t0. Next for (C, D) scheduling is performed to set up a rendezvous time t2>t1. Now, in the meantime, assume the priorities change such that that (C, D) now has higher priority.

If the priority of (C, D) increases above (A, B) in the time between t0 and t1, then packing is performed. This involves trying to find an earlier slot where (C, D) can rendezvous before (A, B). This assumes that free nodes (C and/or D) scan other nodes when idle and in the event another node is attempting to communicate with it, it responds. (C, D) attempt to set up a new rendezvous time ahead of the committed time t2. In this way, (C, D) will precede (A, B) in priority. With packing, it will also be possible to extend the next meeting time with lower priority nodes for a longer period.

In some embodiments, an additional feature is provided that allows traffic characteristics and interference patterns to be examined, with a view to potentially dedicating a radio to a particular node or nodes. For the particular example above, if N3 is the busiest node, designating a radio to this particular node would restrict transmission to N2 and N4 to take place on an opportunistic basis when N3 is not transmitting. Therefore it would not make sense to dedicate a radio to N3. Similar reasoning applies to N2 and N4. However, it can be seen that it might be practical to dedicate a radio to N1 if it in fact was a high throughput node.

Recall that the scheduling blocks are prioritized on an ongoing basis. Prioritization can be performed using any appropriate mechanism; a number of particular examples are given below, but it is to be understood that the invention is not limited to these. When a node is transmitting to the neighbours belonging to the same scheduling block in different time intervals, the priority may be evaluated for an individual subset of neighbours, instead of the priority of the entire scheduling block. The following are examples of prioritization criteria that may be used:

a) the amount of traffic that was sent to a particular neighbour during the last T seconds;

b) the priority of a packet to be transmitted on a particular link relative to other packets. This might depend on:

the link priority (based on an average load);

end user priority;

fairness among links may be implemented by providing a weighted priority to different links based on the total number of links to the central nodes;

quality of service may be selected using a QoS (Quality of Service) tag in the packet and/or a delay tag such as time to deliver tag of a packet (if available) to prioritize packets;

number of hops from central nodes.

c) queue length;

d) aggregate capacity.

e) one hop neighbour information (e.g., peer scheduling block information for the respective node, traffic needs, etc) shared during rendezvous.

f) number of scheduling blocks that a neighbour node belongs to.

These criteria can also be combined. For example, b) and c) could be combined as a weighted packet load per link. A composite prioritization is then derived for the entire scheduling block by taking into account the individual criteria for each of the nodes in the scheduling block.

The flowchart of FIG. 8 is a very specific example of how negotiation might take place for a particular node (node N0) to communicate with three neighbours of a scheduling block using N radios $R_1, R_2 \ldots R_N$. Other implementations are possible. In the example it is assumed that each time a scheduling block is to be transmitted, this is directly preceded by a negotiation to select when the scheduling block should next be transmitted. Alternatively, the negotiation could be after the data transmission or at some other time.

The very first action that will be performed in a new rendezvous is simultaneous negotiation for the next meeting time.

At step 8-1, N0 ($R_1$), N0 ($R_2$), ..., N0 ($R_N$) at node 0 will rendezvous with their respective neighbours in a scheduling block to perform negotiations. At step 8-2, the next earliest meeting time, required duration and maximum available duration are exchanged with each node in the scheduling block. At step 8-3, the scheduler in N0 will compare the meeting times and durations and respond to all the neighbours with a common next meeting time and duration. At step 8-4, the neighbours acknowledge the next meeting time. At step 8-5, data transmission is then performed for the current assigned duration. This data exchange may be bi-directional, and communication between the nodes follows the protocols applicable to the air interface in use.

Numerous modifications and variations of the present invention are possible in light of the above teachings. It is therefore to be understood that within the scope of the appended claims, the invention may be practiced otherwise than as specifically described herein.

We claim:

1. A method in a wireless network node comprising:

for a set of neighbouring nodes to the wireless network node, determining a map of interfering neighbours that determines which neighbouring node(s) interfere with which other neighbouring node(s) were they to simultaneously communicate with the wireless network node;

using the map of interfering neighbours, determining a set of scheduling blocks, at least one scheduling block of the set of scheduling blocks comprising two or more neighbours that can be communicated with simultaneously without interference; and scheduling communication with the neighbouring nodes using the scheduling blocks;

wherein scheduling communication with the neighbouring nodes comprises prioritizing the scheduling blocks;

wherein prioritizing the scheduling blocks comprises:

for scheduling blocks comprising two or more neighbours:

determining a priority factor for each neighbouring node in a scheduling block;

determining a composite priority by taking into account individual criteria for each of the nodes in the scheduling block; and scheduling the scheduling blocks with two or more neighbors using the composite priorities.

2. The method of claim 1 wherein aggregate capacity is a factor considered in prioritizing the scheduling blocks.

3. The method of claim 1 wherein the steps of determining a map of interfering neighbours and determining the set of scheduling blocks are performed whenever there is a change in wireless network topology.

4. The method of claim 1 wherein the steps of determining a map of interfering neighbours and determining the set of scheduling blocks are performed whenever a change in the propagation environment is detected.

5. The method of claim 1 wherein determining a set of scheduling blocks comprises, until all or sufficient scheduling blocks have been identified:

selecting a first neighbour as a first member of a scheduling block; and iteratively selecting further neighbour(s) to be added to the scheduling block that do not interfere with those already selected.

6. The method of claim 1 further comprising:
mapping scheduling blocks to radios in a manner that minimizes the number of switches between radios used to communicate with a neighbour included in consecutively scheduled scheduling blocks.

7. The method of claim 1 further comprising automatically detecting changes in network topology.

8. The method of claim 1 further comprising:
self-determining how many radios are installed in the wireless network node;
if there is a single radio, performing single radio scheduling; and
if there are multiple radios, performing the steps of determining the map of interfering neighbours, determining the set of scheduling blocks, and scheduling communication to the neighbouring nodes using the scheduling blocks.

9. The method of claim 1 further comprising:
performing neighbour discovery to identify the set of neighbour nodes;
if the number of neighbours is less than or equal to the number of radios, and non-interfering communication with all of the neighbours is possible, dedicating a radio per neighbour; and
if the number of neighbours is greater than the number of radios, or non-interfering communication with all of the neighbours is not possible, performing the steps of determining the map of interfering neighbours, determining the set of scheduling blocks, and scheduling communication with the neighbouring nodes using the scheduling blocks.

10. The method of claim 1 wherein scheduling communication with the neighbouring nodes using the scheduling blocks comprises:
negotiating with members of a scheduling block to determine time and duration to schedule the scheduling block; and
communicating with members of the scheduling block for the agreed upon time and duration.

11. The method of claim 10 further comprising:
performing said negotiation immediately before or immediately after completing a data communication with members of the scheduling block for a current scheduling period.

12. The method of claim 1 implemented simultaneously by a plurality of wireless nodes in the wireless network.

13. A wireless network node comprising:
at least two radios;
an interference mapper adapted to determining a map of interfering neighbours that determines which neighbouring node(s) interfere with which other neighbouring node(s) were they to simultaneously communicate with the wireless network node; and
a scheduler adapted to use the map of interfering neighbours to determine a set of scheduling blocks, at least one scheduling block of the set of scheduling blocks comprising two or more neighbours that can be communicated with simultaneously without interference, and to schedule communication to the neighbouring nodes using the scheduling blocks;
wherein the scheduler prioritizes the scheduling blocks;
wherein to prioritize the scheduling blocks the scheduler is adapted to:
for scheduling blocks comprising two or more neighbours:
determine a priority factor for each neighbouring node in a scheduling block;
determine a composite priority by taking into account individual criteria for each of the nodes in the scheduling block; and
schedule the scheduling blocks with two or more neighbors using the composite priorities.

14. The wireless network node of claim 13 wherein the steps of determining a map of interfering neighbours and determining the set of scheduling blocks are performed whenever there is a change in wireless network topology, and/or whenever a change in the propagation environment is detected.

15. The wireless network node of claim 13 further adapted to self-determine how many radios are installed in the wireless network node and to perform single or multi-radio scheduling based on how many radios are installed in the wireless network node.

16. The wireless network node of claim 13 wherein the scheduler schedules communication with the neighbouring nodes using the scheduling blocks by negotiating with members of a scheduling block to determine time and duration to schedule the scheduling block.

17. A wireless network comprising a plurality of wireless network nodes according to claim 13.

18. The wireless network node of claim 13 wherein the scheduler considers aggregate capacity as a factor in prioritizing the scheduling blocks.

19. The wireless network node of claim 13 wherein the scheduler determining a set of scheduling blocks is adapted to, until all or sufficient scheduling blocks have been identified:
select a first neighbour as a first member of a scheduling block; and
iteratively select further neighbour(s) to be added to the scheduling block that do not interfere with those already selected.

20. The wireless network node of claim 13, wherein the wireless network node is further adapted to:
map scheduling blocks to radios in a manner that minimizes the number of switches between radios used to communicate with a neighbour included in consecutively scheduled scheduling blocks.

* * * * *